Oct. 31, 1961　　　O. C. HOLDERER　　　3,006,630
WIND TUNNEL ACCESS MECHANISM
Filed Sept. 9, 1960　　　2 Sheets-Sheet 1

Oscar C. Holderer,
INVENTOR.

BY S. J. Rotondi
A. T. Dupont
Jack W. Voigt

Oct. 31, 1961 O. C. HOLDERER 3,006,630
WIND TUNNEL ACCESS MECHANISM

Filed Sept. 9, 1960 2 Sheets-Sheet 2

Oscar C. Holderer,
*INVENTOR.*

BY S. J. Rotondi
A. T. Dupont
Jack W. Voigt

United States Patent Office 3,006,630
Patented Oct. 31, 1961

3,006,630
WIND TUNNEL ACCESS MECHANISM
Oscar C. Holderer, Huntsville, Ala., assignor to the United States of America as represented by the Secretary of the Army
Filed Sept. 9, 1960, Ser. No. 55,100
8 Claims. (Cl. 268—66)
(Granted under Title 35, U.S. Code (1952), sec. 266)

The invention described herein may be manufactured and used by or for the Government for governmental purposes without the payment of any royalty thereon.

This invention relates to a wind tunnel access mechanism. Such a mechanism is especially useful with chambers containing fluid under pressure which is greater than the pressure surrounding the chamber, and is also suitable for use with vaults or safes requiring heavy closures.

The conventional mechanism used with a wind tunnel consists of a heavy door, which is very difficult to open and close, locked to the tunnel by bolts, or by cross-bars bolted to the tunnel. Therefore, if the tunnel must be entered any number of times, the opening process is time consuming and requires considerable physical effort.

In view of these facts, an object of this invention is to provide a wind tunnel access mechanism that is especially suitable for use with large wind tunnels.

Another object of the invention is to provide a wind tunnel access mechanism which utilizes a single prime motor for providing the forces necessary for actuating the mechanism.

A further object is to provide a wind tunnel access mechanism that can be closed and locked or unlocked and opened in a minimum of time.

A still further object is to provide a wind tunnel access mechanism suitable for use with wind tunnels which are subject to large forces.

The foregoing and other objects of this invention will become more fully apparent from the following detailed description and from the accompanying drawings in which.

Figure 2:
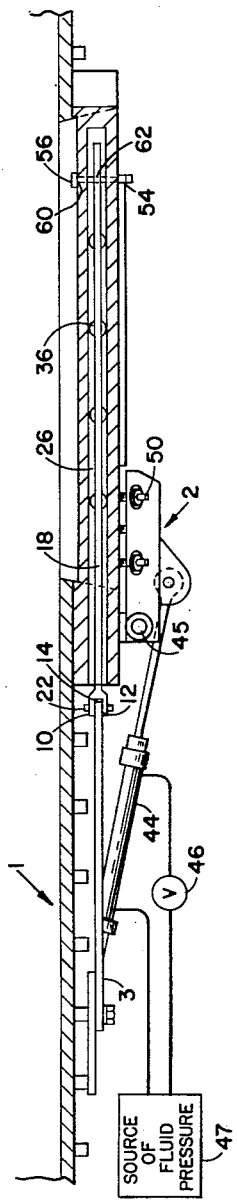
FIGURE 2 is a plan view, with an upper access plate removed, of FIGURE 1 illustrating one of the bars used for operating the locking pins.

Referring more particularly to the drawings wherein like reference characters designate like or corresponding parts throughout the different views, the numeral 1 designates a portion of a wind tunnel having an access mechanism 2 attached to the tunnel.

Figure 1:
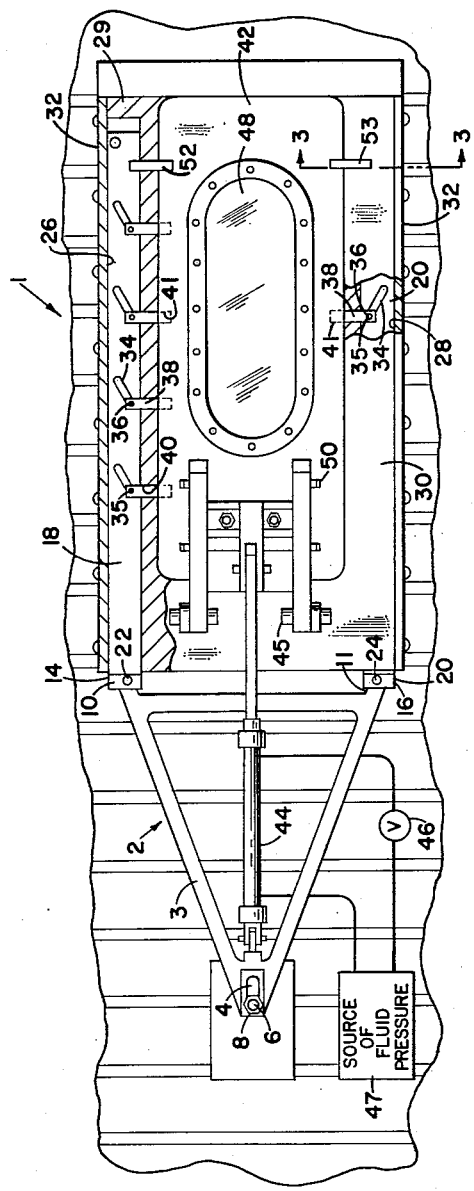
FIGURE 1 is an elevational view, partly broken away, of the invention.
Figure 3:
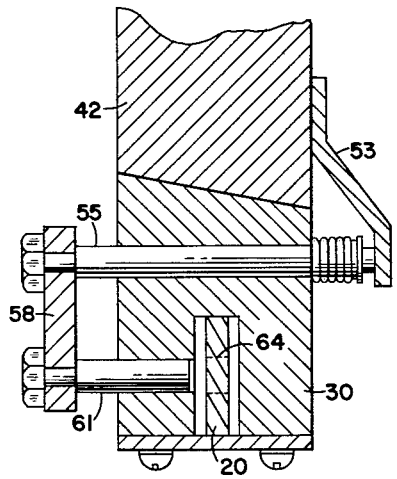
FIGURE 3 is an enlarged sectional view along line 3—3 of FIGURE 1 illustrating a means for locking the operating bars.

One end of the mechanism is provided with a triangular member 3 having a slot 4 formed in its vertex. The slot is placed over bolt 6, which is secured to wind tunnel 1, and is slidably secured to bolt 6 by a combined flat washer and nut 8. The base end of member 3 has a pair of ears 10 and 11, which are provided with apertures 12. Each ear 10 and 11 can be rigidly attached to member 3, or as shown in FIGURES 1 and 2 can be pivotably secured in interstices 14 and 16, provided with apertures in their sides, respectively, formed on one end of bars 18 and 20. Apertures 12 are aligned with the apertures in the sides of interstices 14 and 16 enabling pins 22 and 24 to be inserted thru the apertures to form the above pivot.

The major portion of bars 18 and 20 is slidably enclosed in channels 26 and 28 of a U-shaped member, having guide-frames 29 and 30, by removable plates 32. Each of the enclosed portions of bars 18 and 20 is provided with a plurality of angled slots 34. These slots are arranged for receipt of a pin 35, which movably attaches the intersticed end 36 of bolts 38 to bars 18 and 20. The other end of bolts 38 is disposed for passage thru a plurality of apertures 40, in the walls of guide-frames 29 and 30, and for coaction with a plurality of apertures 41 in the walls of a movable member 42. The walls of member 42, of guide-frames 29 and 30 and the wind tunnel walls are angled as shown in FIGURE 2.

Member 42 is actuated by a fluid motor 44 flow-connected to a valve 46 for controlling the fluid pressure from source 47. One end of motor 44 is pivotably connected to triangular member 3 adjacent slot 4. The other end of motor 44 is pivotably connected to a double hinge 45, which has one end secured to movable member 42 adjacent an inspection window 48 and the other end secured to the U-shaped member. The hinge is also provided with a plurality of adjusting screws 50 for aligning member 42 with the surrounding walls, to eliminate sticking of the member.

Figure 4:
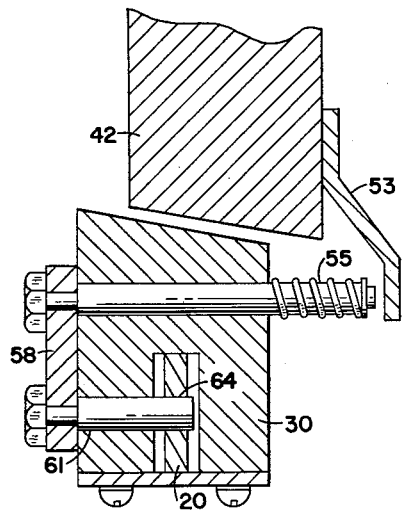
FIGURE 4 is a sectional view, similar to FIGURE 3, showing the means in FIGURE 3 in locking position and the closure partly open.

The other end of movable member 42, opposite from hinge 45, has a pair of arms 52 and 53 each extending over the adjacent guide-frame and in abutment with a spring-loaded rod 54 and 55. Each rod passes thru the adjacent guide-frame and is attached to one end of a bar 56 and 58. The other end of each bar 56 and 58 has a second rod 60 and 61, respectively, extending into the adjacent guide-frame and attached to their end. Rods 60 and 61 are of a length, which is sufficient to engage bores 62 and 64 in bars 18 and 20, respectively, when member 42 is opened (FIGURE 4), thereby retaining bars 18 and 20 in position until member 42 is closed.

Figure 5:
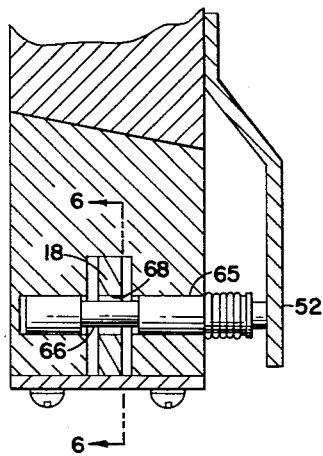
FIGURE 5 is a sectional view of another means for locking the operating bars.
Figure 6:
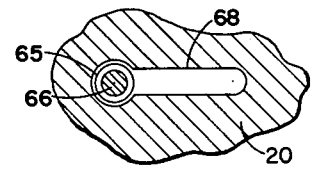
FIGURE 6 is a sectional view along the plane of line 6—6 of FIGURE 5, partly broken away, showing the keyhole arrangement used in FIGURE 5.

A second means for retaining bars 18 and 20 in the above position is shown in FIGURES 5 and 6. This means consists of utilizing one spring-loaded rod 65 having reduced portion 66 extending thru a keyhole slot 68, in bars 18 and 20 to replace each of the above retaining means (rods 54 and 55, bars 56 and 58 and rods 60 and 61). This type rod is also controlled by arms 52 and 53, and will keep bars 18 and 20 from sliding while member 42 is open. This retention of bars 18 and 20 is made possible due to the spring moving the enlarged part of rod 65 into engagement with the enlarged part of the keyhole, formed in bars 18 and 20.

The operation of the mechanism is as follows:

With the mechanism in the position shown in FIGURES 1 and 2, valve 46 is operated to supply fluid pressure to motor 44 from fluid pressure source 47. The actuation of the motor moves the motor housing, which has one end attached to the triangular member. This movement causes the triangular member to move along bolt 6, until the bolt engages an end of slot 4. Simultaneously with the above movements, bars 18 and 20 are moved causing pins 35, which pass thru angled slots 34 and secure bolts 38 to bars 18 and 20, to move along the angled slots, thereby removing bolts 38 from the apertures in member 42.

When the above movements are completed (the motor housing has reached the limit that it can move) the motor continues to operate, this time moving its piston. This movement of the motor's piston swings movable member 42 about hinge 45, until valve 46 is closed or the piston in motor 44 reaches its operating limit.

This movement of member 42 releases the tensioned springs on rods 54 and 55 due to arms 52 and 53, which are rigidly connected to member 42, disengaging from the ends of rods 54 and 55. As the tensioned springs are released they move rods 54 and 55 until bars 56 and 58 engage a portion of guide frames 29 and 30. At this point rods 60 and 61 engage bores 62 and 64 in bars 18 and 20. When the rods 60 and 61 are in engagement with the bores in bars 18 and 20, the bars are restrained from movement until member 42 closes, causing arms 52 and 53 to remove rods 60 and 61 from contact with the bores in the bars.

The means shown in FIGURES 5 and 6 for locking the bars is operated in the same manner, but utilizes a simpler one-rod arrangement, which coacts with a keyhole.

It is to be understood that the preferred invention is herein shown and described, and that various changes in the shape, size and arrangement of parts may be resorted to without departing from the spirit of the invention, or the scope of the subjoined claims.

The following invention is claimed:

1. A wind tunnel access mechanism comprising: a U-shaped member secured to the wall of a wind tunnel; a movable member having three sides surrounded by said U-shaped member; a hinge having one end secured to said movable member and the other end attached to said U-shaped member; means retained in said U-shaped member for controlling movement of said movable member; means in said movable member for coacting with a part of said means retained in said U-shaped member; means for locking said means retained in said U-shaped member, when said movable member is open, in an inoperative position; a triangular element having its base attached to a second portion of said means retained in said U-shaped member; means provided at the vertex of said triangular element for enabling the position of said element to change; means, having one end attached to said triangular element and the other end attached to said hinge, for first providing a force in one direction to move said element and means connected thereto and then providing a force in a different direction for opening said movable member and capable of reversing the forces to close said movable member; and means for providing operating power for said means connected to said element and hinge.

2. A device as set forth in claim 1, in which said means retained in said U-shaped member comprises two parallel bars provided with a plurality of angled slots, and a plurality of bolts having one end slidably secured in said slots and the other end extending thru the inner parallel walls of said U-shaped member.

3. A device as set forth in claim 1, in which said means in said movable member comprises a plurality of spaced apertures.

4. A device as set forth in claim 1, in which said means for locking said means retained in said U-shaped member when said movable member is open comprises spring loaded rods, one secured in each end of said U-shaped member, adapted to engage said means retained in said U-shaped member, and a pair of angled arms, one secured to each side of said movable member adjacent said rods, adapted to control movement of said rods.

5. A device as set forth in claim 1, in which said means provided at the vertex of said triangular element comprises a slot engaged by a portion of said wind tunnel.

6. A device as set forth in claim 1, in which said means attached to said element and hinge comprises a motor operated by fluid pressure.

7. A device as set forth in claim 1, in which said means for providing operating power comprises a control valve and a source of fluid pressure.

8. A wind tunnel access mechanism secured to a wind tunnel comprising: a U-shaped member provided with a pair of spaced parallel channels, and a plurality of apertures joining said channels with the inner portion of said member; means for providing access to said channels; a pair of bars arranged for movement in said channels, said bars being provided with a plurality of angled slots intermediate their ends, and an aperture in each end; means, adapted to engage one of the end apertures in each of said bars, for locking said bars in place; a plurality of bolts having one end extending thru said plurality of apertures and their other end slidably connected with said slots; a hinge having one end connected to the base portion of said U-shaped member; a movable member connected, adjacent one of its ends to the other end of said hinge, said movable member being provided with a plurality of apertures in alignment with said apertures in said U-shaped member; means secured to said movable member, adjacent its other end, for controlling the means for locking said bars, when said movable member is actuated; a triangular member having its base pivotably secured to the aperture in one end of said bars, adjacent said hinge, said triangular member being provided with an oblong slot adjacent its vertex; stationary means, extending thru said slot, for slidably retaining said triangular member; means having one end pivotably attached to said triangular member and its other end pivotably secured to said hinge for actuating said movable member; and means for controlling operation of said last-named means.

References Cited in the file of this patent

UNITED STATES PATENTS 2,719,682     Handel _____ Oct. 4, 1955